(12) United States Patent
Cao

(10) Patent No.: US 11,749,223 B2
(45) Date of Patent: Sep. 5, 2023

(54) LIQUID CRYSTAL PIXEL DRIVING CIRCUIT SOLVING INSTABILITY PROBLEM DURING PULL-DOWN HOLDING PHASE

(71) Applicant: WUHAN CHINA STAR OPTOELECTRONICS TECHNOLOGY CO., LTD., Hubei (CN)

(72) Inventor: Haiming Cao, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 332 days.

(21) Appl. No.: 17/057,667

(22) PCT Filed: Sep. 17, 2020

(86) PCT No.: PCT/CN2020/115739
§ 371 (c)(1),
(2) Date: Nov. 22, 2020

(87) PCT Pub. No.: WO2022/011821
PCT Pub. Date: Jan. 20, 2022

(65) Prior Publication Data
US 2022/0375423 A1 Nov. 24, 2022

(30) Foreign Application Priority Data
Jul. 17, 2020 (CN) .......................... 202010690981.2

(51) Int. Cl.
*G09G 3/36* (2006.01)

(52) U.S. Cl.
CPC ......... *G09G 3/3677* (2013.01); *G09G 3/3688* (2013.01); *G09G 2300/0852* (2013.01);
(Continued)

(58) Field of Classification Search
CPC ...... G09G 3/36; G09G 3/3611; G09G 3/3614; G09G 3/3622; G09G 3/3625;
(Continued)

(56) References Cited

U.S. PATENT DOCUMENTS 6,476,786 B1 * 11/2002 Miyachi ............... G09G 3/3648
345/92
8,836,680 B2 * 9/2014 Zebedee .............. G09G 3/3614
345/96

(Continued)

FOREIGN PATENT DOCUMENTS

| CN | 106531111 A | 3/2017 |
|---|---|---|
| CN | 111312187 A | 6/2020 |
| TW | 201533725 A | 9/2015 |

*Primary Examiner* — Amit Chatly
*Assistant Examiner* — Nelson Lam
(74) *Attorney, Agent, or Firm* — PV IP PC; Wei Te Chung; Zhigang Ma

(57) ABSTRACT

The present disclosure provides a pixel driving circuit and a display panel. After pre-charging a first node to a first electrical potential, raising it to a second electrical potential through a first capacitor by a current row gate output signal G(n), and then raising it to a third electrical potential which is a high electrical potential greater than an electrical potential of the current row gate output signal G(n), so that a first transistor is turned on and data is written, raising an original electrical potential of a gate and improving driving capability since a gate electrical potential of the first transistor can be raised to greater than the G(n).

18 Claims, 4 Drawing Sheets

(52) U.S. Cl.
CPC .............. *G09G 2310/0291* (2013.01); *G09G 2310/0294* (2013.01); *G09G 2310/08* (2013.01)

(58) Field of Classification Search
CPC .. G09G 3/3674; G09G 3/3677; G09G 3/3681; G09G 3/3688; G09G 3/3692; G09G 3/3696
USPC .................................................. 345/87–104
See application file for complete search history.

(56) References Cited

U.S. PATENT DOCUMENTS

| | | | |
|---|---|---|---|
| 2003/0122756 A1* | 7/2003 | Kim ..................... | G09G 3/3648 345/87 |
| 2008/0170028 A1* | 7/2008 | Yoshida .................. | G09G 3/20 345/100 |
| 2010/0085294 A1* | 4/2010 | Otose ..................... | G11C 19/28 377/79 |
| 2011/0298531 A1* | 12/2011 | Shah ..................... | G09G 3/3648 327/562 |
| 2013/0100106 A1* | 4/2013 | Wu ....................... | G09G 3/2081 345/212 |
| 2015/0262542 A1* | 9/2015 | Lin ....................... | G09G 3/3659 345/87 |
| 2017/0154591 A1 | 6/2017 | Hung | |
| 2017/0352320 A1* | 12/2017 | Lin ....................... | G09G 3/3677 |

* cited by examiner

LIQUID CRYSTAL PIXEL DRIVING CIRCUIT SOLVING INSTABILITY PROBLEM DURING PULL-DOWN HOLDING PHASE

FIELD OF INVENTION

The present disclosure relates to the field of display technology, and more particularly to a pixel driving circuit and a display panel.

BACKGROUND OF INVENTION

Current display technology requirements are applicable to both high frequency and low frequency conditions, so that display panels not only have an advantage of smooth picture quality brought by high frequency, but also have an advantage of low power consumption brought by low frequency. Therefore, dynamic frame rate technology came into being. This technology can adjust a refresh frequency of the display panels in real time, thereby satisfying both ultra-low frequency and ultra-high frequency display requirements. For low-frequency display requirements, since a holding time of each frame of low-frequency state is extended to tens of times the original, it requires the display panels to have a better screen holding ability; for high-frequency display requirements, due to an extremely short charging time of each row of pixels, the display panels need to have a better charging ability, and if a high refresh rate is used to display static or low-speed object images, it will cause a problem of excessive logic power consumption of the display panels.

Traditional backplane technologies include amorphous silicon (A-Si), low temperature polysilicon (LTPS), and indium gallium zinc oxide (IGZO) technologies. Compared with A-Si technology, LTPS and IGZO technologies are widely used due to higher mobility. Among them, because LTPS technology has higher mobility and smaller component area than IGZO technology, it has better charging capacity and is more suitable for high-frequency applications; meanwhile, IGZO technology has better uniformity and less leakage current than LTPS technology, so it is more power saving, has better picture holding ability, and is more suitable for low frequency applications. It can be understood that the traditional backplane technologies cannot meet a requirement of dynamic frame rate due to monism of technology which results in monistic performance advantage.

A composite low temperature polycrystalline oxide (LTPO) technology combines the advantages of LTPS and IGZO technologies, so that the display panels have characteristics of better charging ability and low power consumption, and meet the requirements of high frequency and low frequency. Therefore, LTPO technology is suitable for the requirements of dynamic frame rate technology, and can achieve a purpose of improving users' visual experience and optimizing power consumption.

However, as mentioned above, because the mobility of IGZO is less than that of LTPO, IGZO has a shorter charging period at high frequencies and often causes a problem of insufficient charging electrical potential. Therefore, it is necessary to increase a charging current of IGZO to reach the charging electrical potential within the shorter charging period. At present, there are two ways to increase the charging current on an IGZO active layer: first, increasing an aspect ratio of a thin film transistor TFT, but this method will make the thin film transistor TFT larger in size and occupy too much space, resulting in a problem of reduced aperture ratio of the display panels; second, increasing a gate-source voltage difference Vgs of all thin film transistors TFTs of the display panels, but this method will increase a stress on all thin film transistors TFTs and make the thin film transistors TFTs prone to aging, thereby affecting an overall stability of a driving circuit, that is, not only affecting a stability of a peripheral driving circuit, but also affecting a stability of an AA area driving circuit.

Referring to FIG. 1, FIG. 1 is a diagram of a structure of a current 1T2C pixel driving circuit. This circuit uses a 1T2C circuit, including a driving switch T10, a storage capacitor Cst, and a liquid crystal capacitor Clc, wherein a gate of the driving switch T10 is inputted a current row gate output signal G(n), a drain of the driving switch T10 is electrically connected to one terminal of the storage capacitor Cst and one terminal of the liquid crystal capacitor Clc, and a source of the driving switch is electrically connected to a data line. The current row gate output signal G(n) is sent to control a switch of the driving switch T10, when turning on the driving switch T10, charging the liquid crystal capacitor Clc and the storage capacitor Cst to a required voltage by the data line, then turning off the driving switch T10, and discharging the storage capacitor Cst to maintain the voltage of the liquid crystal capacitor Clc until the next update. Since when the 1T2C circuit works, the driving switch T10 can only be a single type of TFT wherein each TFT has its advantages and disadvantages, if the 1T2C circuit is applied to both LTPS and IGZO in the dynamic frame rate technology, it may very likely not meet the requirement of increasing the charging current of IGZO.

Therefore, how to drive the IGZO with a higher voltage to increase the charging current of the IGZO while ensuring an overall stability of the driving circuit of the display panel has become a problem to be solved urgently.

SUMMARY OF INVENTION

In order to solve the problem of instability of the current GOA circuit during the pull-down holding phase, the present disclosure provides a first transistor, a second transistor, a third transistor, a first capacitor, a second capacitor, a storage capacitor, and a liquid crystal capacitor, wherein each of the first transistor, the second transistor, and the third transistor includes a source, a gate, and a drain, and each of the first capacitor, the second capacitor, the storage capacitor, and the liquid crystal capacitor includes a first terminal and a second terminal.

The gate of the first transistor is electrically connected to a first node, the source of the first transistor is electrically connected to the first terminal of the second capacitor, and the drain of the first transistor is electrically connected to the first terminal of the storage capacitor and the first terminal of the liquid crystal capacitor; the gate of the second transistor is electrically connected to a previous row gate output signal (G(n−1)), the source of the second transistor is electrically connected to a data signal, and the drain of the second transistor is electrically connected to the first node; the gate of the third transistor is electrically connected to a next row gate output signal (G(n+1)), the source of the third transistor is electrically connected to the first node, and the drain of the third transistor is electrically connected to a constant voltage low electrical potential (VGL); the first terminal of the first capacitor is electrically connected to the first node, and the second terminal of the first capacitor is electrically connected to a current row gate output signal (G(n)); the first terminal of the second capacitor is electrically connected to the data signal, and the second terminal of the second capacitor is electrically connected to the first node; and the first terminal of the storage capacitor and the first terminal of the liquid crystal capacitor are respectively electrically connected to the drain of the first transistor, and the second terminal of the storage capacitor and the second terminal of the liquid crystal capacitor are respectively electrically connected to a common signal.

In some embodiments, the pixel driving circuit operates in a pre-charge phase (B0), a first boost phase (B1), a second boost phase (B2), a transition phase (B3), and a holding phase (B4).

If the first transistor, the second transistor, and the third transistor are N-type thin film transistors, wherein the pre-charge phase (B0) includes steps of: turning on the second transistor and turning off the third transistor, and charging an electrical potential of the first node to a first electrical potential (V1) through the second transistor by the current row gate output signal (G(n)).

The first boost phase (B1) includes steps of: turning off the second transistor and the third transistor, providing a first high electrical potential signal (S1) by the data signal, and raising the electrical potential of the first node from the first electrical potential (V1) to a second electrical potential (V2) through the first capacitor by the data signal.

The second boost phase (B2) includes steps of: turning off the second transistor and the third transistor, providing a second high electrical potential signal (S2) by the data signal, raising the electrical potential of the first node from the second electrical potential (V2) to a third electrical potential (V3) by the second capacitor, and writing the second high electrical potential signal (S2) into the liquid crystal capacitor, wherein the is third electrical potential (V3) is greater than a high electrical potential (V0) of a gate output signal.

The transition phase (B3) includes steps of: turning off the first transistor, the second transistor, and the third transistor, pulling down the electrical potential of the first node from the third electrical potential (V3) to a fourth electrical potential (V4) through the first capacitor by the current row gate output signal (G(n)), and pulling down the electrical potential of the first node from the fourth potential (V4) to the constant voltage low electrical potential (VGL) by the next row gate output signal (G(n+1)).

The holding phase (B4) includes steps of: turning off the first transistor and the second transistor, turning on the third transistor, and holding the electrical potential of the first node at the constant voltage low electrical potential (VGL) by the next row gate output signal (G(n+1)).

In some embodiments, the first transistor, the second transistor, and the third transistor are oxide semiconductor thin film transistors.

In some embodiments, the first transistor is an oxide semiconductor thin film transistor, and the second transistor and the third transistor are both low temperature polysilicon thin film transistors.

In some embodiments, in the pre-charge phase (B0), the previous row gate output signal (G(n−1)) is at the high electrical potential (V0) before an initial period (A0) and is converted to a low electrical potential at a beginning of the initial period (A0), the current row gate output signal (G(n)) is at the low electrical potential, the next row gate output signal (G(n+1)) is at the low electrical potential, the data signal before a first period (A1) is the first high electrical potential signal (S1) and is at the low electrical potential in the first period (A1), and electrical potentials of the first high electrical potential signal (S1) and the first electrical potential (V1) are the same.

In some embodiments, in the first boost phase (B1), the previous row gate output signal (G(n−1)) is at the low electrical potential, the current row gate output signal (G(n)) is at the high electrical potential (V0), the next row gate output signal (G(n+1)) is at the low electrical potential, and the data signal is at the low electrical potential.

In the second boost phase (B2), the previous row gate output signal (G(n−1)) is at the low electrical potential, the current row gate output signal (G(n)) is at the high is electrical potential (V0), the next row gate output signal (G(n+1)) is at the low electrical potential, and the data signal is at the second high electrical potential signal (S2).

In the transition phase (B3), the previous row gate output signal (G(n−1)) and the current row gate output signal (G(n)) are at the low electrical potential, and the data signal is kept at the second high electrical potential signal (S2) before a second period (A2) and is converted to the low electrical potential at a beginning of the second period (A2).

In the holding phase (B4), the previous row gate output signal (G(n−1)) and the current row gate output signal (G(n)) are at the low electrical potential, and the next row gate output signal (G(n+1)) is a pulse of the high electrical potential V0.

In some embodiments, a relationship between the first electrical potential (V1) and the second electrical potential (V2) is a formula 1:

$$V_2 = (V_0 - VGL) g \frac{C_1}{C_1 + C_2 + 2C_{gs1} + C_{gs2} + C_{gs3}} + V_1 \quad \text{formula 1}$$

wherein $V_1$ is an electrical potential value of the first electrical potential V1, $V_2$ is an electrical potential value of the second electrical potential V2, $C_1$ is a capacitance value of the first capacitor, $V_0$ is an electrical potential value of the high electrical potential V0 of the gate output signal, $C_2$ is a capacitance value of the second capacitor, VGL is the constant voltage low electrical potential, $C_{gs1}$ is a single-sided parasitic capacitance value of the first transistor, $C_{gs2}$ is a single-sided parasitic capacitance value of the second transistor, and $C_{gs3}$ is a single-sided parasitic capacitance value of the third transistor.

In some embodiments, a relationship between the second electrical potential (V2) and the third electrical potential (V3) is a formula 2:

$$V_3 = (S_2 - V_{COM}) g \frac{C_2}{C_1 + C_2 + 2C_{gs1} + C_{gs2} + C_{gs3}} + V_2 \quad \text{formula 2}$$

wherein the $V_2$ is the electrical potential value of the second electrical potential V2, $V_3$ is the electrical potential value of the third electrical potential V3, the $C_1$ is the capacitance value of the first capacitor, $S_2$ is the electrical potential value of the second high electrical potential S2, the $C_2$ is the capacitance value of the second capacitor, $V_{COM}$ is an electrical potential value of the common signal, the $C_{gs1}$ is the single-sided parasitic capacitance value of the first transistor, the $C_{gs2}$ is the single-sided parasitic capacitance value of the second transistor, and the $C_{gs3}$ is the single-sided parasitic capacitance value of the third transistor.

In some embodiments, the third electrical potential (V3) being higher than the high electrical potential (V0) of the gate output signal is realized by adjusting the capacitance values of the first capacitor and the second capacitor based on the formula 1 and the formula 2 with the electrical potential values of the first high potential signal, the second high potential signal, the high electrical potential (V0) of the gate output signal, the constant voltage low electrical potential (VGL), and the common signal ($V_{COM}$).

In some embodiments, the holding phase (B4) includes steps of: holding the data signal at the low electrical potential in a third period (A3), and converting the data signal from the low electrical potential to a third high level signal (S3) after the third period (A3); and replacing the next row gate output signal (G(n+1)) by an enable signal (EMn), wherein the enable signal (EMn) is at the low electrical potential in the pre-charge phase (B0), the first boost phase (B1), the second boost phase (B2), and the transition phase (B3), and is converted to the high electrical potential in the holding phase (B4).

In some embodiments, the holding phase (B4) includes steps of: holding the data signal at the low electrical potential.

The present disclosure also provides a display panel, including a pixel driving circuit, the pixel driving circuit includes: a first transistor, a second transistor, a third transistor, a first capacitor, a second capacitor, a storage capacitor, and a liquid crystal capacitor, wherein each of the first transistor, the second transistor, and the third transistor includes a source, a gate, and a drain, and each of the first capacitor, the second capacitor, the storage capacitor, and the liquid crystal capacitor includes a first terminal and a second terminal.

The gate of the first transistor is electrically connected to a first node, the source of the first transistor is electrically connected to the first terminal of the second capacitor, and the drain of the first transistor is electrically connected to the first terminal of the storage capacitor and the first terminal of the liquid crystal capacitor; the gate of the second transistor is electrically connected to a previous row gate output signal (G(n−1)), the source of the second transistor is electrically connected to a data signal, and the drain of the second transistor is electrically connected to the first node, the gate of the third transistor is electrically connected to a next row gate output signal (G(n+1)), the source of is the third transistor is electrically connected to the first node, and the drain of the third transistor is electrically connected to a constant voltage low electrical potential (VGL); the first terminal of the first capacitor is electrically connected to the first node, and the second terminal of the first capacitor is electrically connected to a current row gate output signal (G(n)); the first terminal of the second capacitor is electrically connected to the data signal, and the second terminal of the second capacitor is electrically connected to the first node; and the first terminal of the storage capacitor and the first terminal of the liquid crystal capacitor are respectively electrically connected to the drain of the first transistor, and the second terminal of the storage capacitor and the second terminal of the liquid crystal capacitor are respectively electrically connected to a common signal.

In some embodiments, the pixel driving circuit operates in a pre-charge phase (B0), a first boost phase (B1), a second boost phase (B2), a transition phase (B3) and a holding phase (B4), and the first transistor, the second transistor and the third transistor are N-type thin film transistors.

In the pre-charge phase (B0) includes steps of: turning on the second transistor and turning off the third transistor, and charging an electrical potential of the first node to a first electrical potential (V1) through the second transistor by the current row gate output signal (G(n)).

In the first boost phase (B1) includes steps of: turning off the second transistor and the third transistor providing a first high electrical potential signal (S1) by the data signal, and raising the electrical potential of the first node from the first electrical potential (V1) to a second electrical potential (V2) through the first capacitor by the data signal.

In the second boost phase (B2) includes steps of: turning off the second transistor and the third transistor, providing a second high electrical potential signal (S2) by the data signal, raising the electrical potential of the first node from the second electrical potential (V2) to a third electrical potential (V3) by the second capacitor, and writing the second high electrical potential signal (S2) into the liquid crystal capacitor, wherein the third electrical potential (V3) is greater than a high electrical potential (V0) of a gate output signal.

In the transition phase (B3) includes steps of: turning off the first transistor, the second transistor, and the third transistor, pulling down the electrical potential of the first node from the third electrical potential (V3) to a fourth electrical potential (V4) through the first capacitor by the current row gate output signal (G(n)), and pulling down the electrical potential of the first node from the fourth potential (V4) to the constant voltage low electrical potential (VGL) by the next row gate output signal (G(n+1)).

In the holding phase (B4) includes steps of: turning off the first transistor and the second transistor, turning on the third transistor, and holding the electrical potential of the first node at the constant voltage low electrical potential (VGL) by the next row gate output signal (G(n+1)).

In some embodiments, the first transistor, the second transistor, and the third transistor are oxide semiconductor thin film transistors.

In some embodiments, the first transistor is an oxide semiconductor thin film transistor, and the second transistor and the third transistor are both low temperature polysilicon thin film transistors.

In some embodiments, in the pre-charge phase (B0), the previous row gate output signal (G(n−1)) is at the high electrical potential (V0) before an initial period (A0) and is converted to a low electrical potential at a beginning of the initial period (A0), the current row gate output signal (G(n)) is at the low electrical potential, the next row gate output signal (G(n+1)) is at the low electrical potential, the data signal before a first period (A1) is the first high electrical potential signal (S1) and is at the low electrical potential in the first period (A1), and electrical potentials of the first high electrical potential signal (S1) and the first electrical potential (V1) are the same.

In the first boost phase (B1), the previous row gate output signal (G(n−1)) is at the low electrical potential, the current row gate output signal (G(n)) is at the high electrical potential (V0), the next row gate output signal (G(n+1)) is at the low electrical potential, and the data signal is at the low electrical potential.

In the second boost phase (B2), the previous row gate output signal (G(n−1)) is at the low electrical potential, the current row gate output signal (G(n)) is at the high electrical potential (V0), the next row gate output signal (G(n+1)) is at the low electrical potential, and the data signal is at the second high electrical potential signal (S2);

In the transition phase (B3), the previous row gate output signal (G(n−1)) and the current row gate output signal (G(n)) are at the low electrical potential, and the data signal is kept at the second high electrical potential signal (S2) before a second period (A2) and is converted to the low electrical potential at a beginning of the second period (A2); and In the holding phase (B4), the previous row gate output signal (G(n−1)) and the current row gate output signal (G(n))

are at the low electrical potential, and the next row gate output signal (G(n+1)) is a pulse of the high electrical potential V0.

In some embodiments, a relationship between the first electrical potential (V1) and the second electrical potential (V2) is a formula 1:

$$V_2 = (V_0 - VGL)g\frac{C_1}{C_1 + C_2 + 2C_{gs1} + C_{gs2} + C_{gs3}} + V_1 \quad \text{formula 1}$$

wherein $V_1$ is an electrical potential value of the first electrical potential V1, $V_2$ is an electrical potential value of the second electrical potential V2, $C_1$ is a capacitance value of the first capacitor, $V_0$ is an electrical potential value of the high electrical potential V0 of the gate output signal, $C_2$ is a capacitance value of the second capacitor, VGL is the constant voltage low electrical potential, $C_{gs1}$ is a single-sided parasitic capacitance value of the first transistor, $C_{gs2}$ is a single-sided parasitic capacitance value of the second transistor, and $C_{gs3}$ is a single-sided parasitic capacitance value of the third transistor.

In some embodiments, a relationship between the second electrical potential (V2) and the third electrical potential (V3) is a formula 2:

$$V_3 = (S_2 - V_{COM})g\frac{C_2}{C_1 + C_2 + 2C_{gs1} + C_{gs2} + C_{gs3}} + V_2 \quad \text{formula 2}$$

wherein the $V_2$ is the electrical potential value of the second electrical potential V2, $V_3$ is the electrical potential value of the third electrical potential V3, the $C_1$ is the capacitance value of the first capacitor, $S_2$ is the electrical potential value of the second high electrical potential S2, the $C_2$ is the capacitance value of the second capacitor, $V_{COM}$ is an electrical potential value of the common signal, the $C_{gs1}$ is the single-sided parasitic capacitance value of the first transistor, the $C_{gs2}$ is the single-sided parasitic capacitance value of the second transistor, and the $C_{gs3}$ is the single-sided parasitic capacitance value of the third transistor.

In some embodiments, the third electrical potential (V3) being higher than the high electrical potential (V0) of the gate output signal is realized by adjusting the capacitance values of the first capacitor and the second capacitor based on the formula 1 and the formula 2, with the electrical potential values of the first high potential signal, the second high potential signal, the high electrical potential (V0) of the gate output signal, the constant voltage low electrical potential (VGL), and the common signal ($V_{COM}$)

In some embodiments, the holding phase (B4) includes steps of: holding the data signal at the low electrical potential in a third period (A3), and converting the data signal from the low electrical potential to a third high level signal (S3) after the third period (A3); and Replacing the next row gate output signal (G(n+1)) by an enable signal (EMn), wherein the enable signal (EMn) is at the low electrical potential in the pre-charge phase (B0), the first boost phase (B1), the second boost phase (B2) and the transition phase (B3), and is converted to the high electrical potential in the holding phase (B4).

In some embodiments, the holding phase (B4) includes steps of: holding the data signal at the low electrical potential.

In the pixel driving circuit and the display panel provided by the present disclosure, the pixel driving circuit adopts a 3T2C structure. After pre-charging a first node Pn to a first electrical potential V1, raising an electrical potential of the first node Pn to a second electrical potential V2 through a first capacitor C1 by a current row gate output signal G(n), then raising the electrical potential of the first node Pn from the second electrical potential V2 to a third electrical potential V3 by the second capacitor C2, making the third electrical potential V3 greater than a high electrical potential V0 of the current row gate output signal G(n) to turn on the first transistor T1 and write data into the liquid crystal capacitor Clc. Since the pixel driving circuit can raise the gate potential of the first transistor T1 to a potential greater than the high electrical potential V0 of the current row gate output signal G(n), the original gate level is raised, so that a driving ability of the first transistor T1 is better, and it can be applied to the requirement of fast charging at high frequency. Hence, even if the first transistor T1 is an IGZO transistor, the pixel driving circuit can be suitable for dynamic frame rate technology.

DETAILED DESCRIPTION OF PREFERRED EMBODIMENTS

In order to make the purpose, technical solutions and effects of the present disclosure clear and specific, the following further describes the present disclosure in detail with reference to the figures and embodiments. It should be understood that the specific embodiments described here are only used to explain the present disclosure, and not used to limit the present disclosure.

All the embodiments of the present disclosure distinguish the two poles other than a gate of the transistor, and one of them is called a source and the other is called a drain. Since the source and drain of the transistor are symmetrical, the source and drain are interchangeable. According to the form in the figure, it is stipulated that the middle terminal of the transistor is the gate, the signal input terminal is the source, and the signal output terminal is the drain. In addition, the transistors used in all embodiments of the present disclosure may include P-type and/or N-type transistors. Among them, the P-type transistors are turned on when the gate is at a low electrical potential, and turned off when the gate is at a high potential; and the N-type transistors are turned on when the electrical potential of the gate is high, and turned off when the electrical potential of the gate is low.

Figure 2:
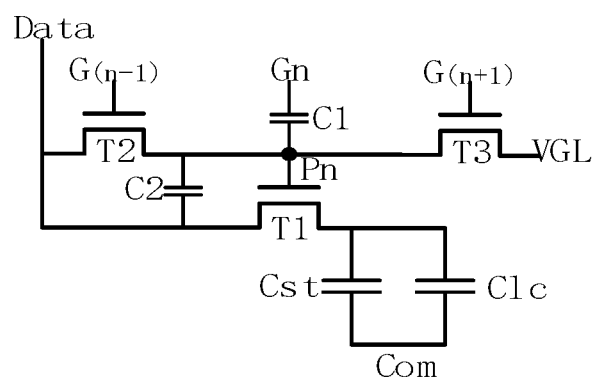
FIG. 2 is a pixel driving circuit according to one embodiment of the present disclosure.

Referring to FIG. 2, FIG. 2 is a pixel driving circuit according to one embodiment of the present disclosure. The embodiment of the present disclosure provides a pixel driving circuit including: a first transistor T1, a second transistor T2, a third transistor T3, a is first capacitor C1, a second capacitor C2, a storage capacitor Cst, and a liquid crystal capacitor Clc, wherein each of the first transistor T1, the second transistor T2, and the third transistor T3 comprises a source, a gate, and a drain, and each of the first capacitor C1, the second capacitor C2, the storage capacitor Cst, and the liquid crystal capacitor Clc includes a first terminal and a second terminal.

The gate of the first transistor T1 is electrically connected to a first node Pn, the source of the first transistor T1 is electrically connected to the first terminal of the second capacitor C2, and the drain of the first transistor is electrically connected to the first terminal of the storage capacitor Cst and the first end of the liquid crystal capacitor Clc.

The gate of the second transistor T2 is electrically connected to a previous row gate output signal G(n−1), the source of the second transistor T2 is electrically connected to a data signal Data, and the drain of second transistor is electrically connected to the first node Pn.

The gate of the third transistor T3 is electrically connected to a next row gate output signal G(n+1), the source of the third transistor T3 is electrically connected to the first node Pn, and the drain of the third transistor T3 is electrically connected to a constant voltage low electrical potential VGL.

The first terminal of the first capacitor C1 is electrically connected to the first node Pn, and the second terminal is connected to the current row gate output signal G(n).

The first terminal of the second capacitor C2 is electrically connected to the data signal Data, and the second terminal of the second capacitor is electrically connected to the first node Pn.

The first terminals of the storage capacitor Cst and the liquid crystal capacitor Clc are respectively electrically connected to the drain of the first transistor T1, and the second terminals of the storage capacitor Cst and the liquid crystal capacitor Clc are respectively electrically connected to a common signal Com.

It should be noted that the main function of the pixel driving circuit provided by the present disclosure is to improve the pixel charging capability at high frequencies. Therefore, according to low-temperature polysilicon (LTPS) thin film transistors having the characteristics of better charging capability but high leakage current, and oxide semiconductor (IGZO) thin film transistors having the characteristics of low leakage current but weak charging ability, this pixel driving circuit is mainly suitable for two types of pixel driving circuits.

The first type is a pixel driving circuit that entirely uses IGZO thin film transistors, that is, the first transistor T1, the second transistor T2, and the third transistor T3 are all IGZO transistors.

The other is a display panel using LTPO technology, that is, a pixel driving circuit of a display panel made by combining LTPS and IGZO thin film transistors. Among them, since the leakage current of the first transistor T1 directly affects the voltage of the liquid crystal capacitor Clc, the first transistor T1 uses IGZO thin film transistors to reduce the leakage current, while the second transistor T2 and the third transistor T3 use LTPS thin film transistors to improve charging ability and driving ability.

It is understandable that the pixel driving circuit can actually also be applied to a pixel driving circuit in which the first transistor T1, the second transistor T2, and the third transistor T3 are all LTPS thin film transistors, but because the LTPS thin film transistor has a relatively better charging ability, the actual meaning is not as great as the above two types of pixel driving circuits.

Figure 3:
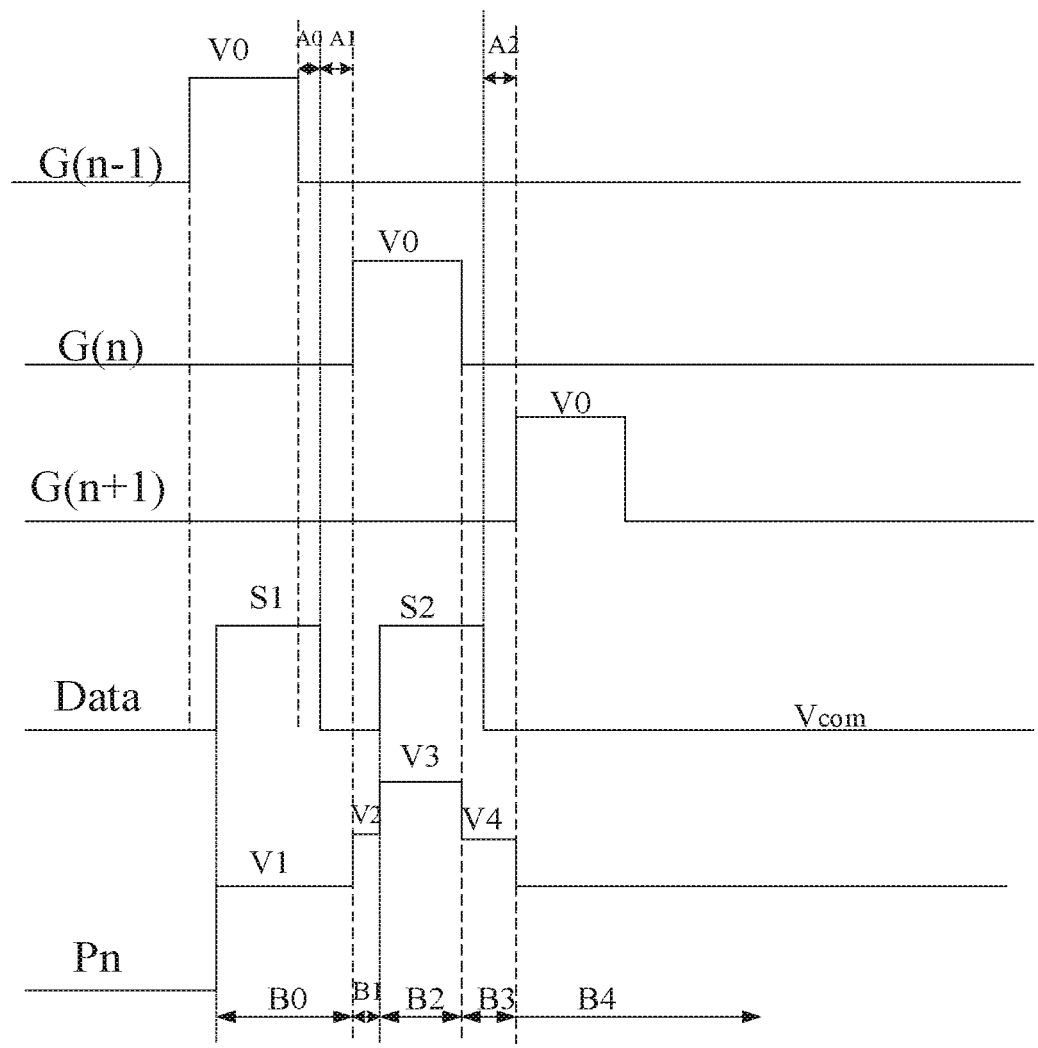
FIG. 3 is a timing diagram of the pixel driving circuit according to one embodiment of the present disclosure.

FIG. 3 is a timing diagram of the pixel driving circuit according to one embodiment of the present disclosure. In conjunction with FIG. 2 and FIG. 3, the following takes the first transistor T1, the second transistor T2, and the third transistor T3 being N-type thin film transistors as an example. The working flow of the driving circuit is explained in detail. Among them, low electrical potentials of the previous row gate output signal G(n−1), the current row gate output signal G(n), the next row gate output signal G(n+1), and the first node Pn are constant voltage low electrical potential VGL; high electrical potentials of the previous row gate output signal G(n−1), the current row gate output signal G(n) and the next row gate output signal G(n+1) is V0; low electrical potentials of the data signal Data is an electrical potential value $V_{COM}$ of the common signal Com.

The pixel driving circuit has a pre-charge phase B0, a first boost phase B1, a second boost phase B2, a transition phase B3, and a holding phase B4.

In the pre-charge phase B0, the previous row gate output signal G(n−1) is at the high electrical potential V0 before an initial period A0 and is converted to a low electrical potential at a beginning of the initial period A0, the current row gate output signal G(n) is at the low electrical potential, the next row gate output signal G(n+1) is at the low electrical potential, the data signal Data before a first period A1 is the first high electrical potential signal (S1) and is at the low electrical potential in the first period A1 converted to a low electrical potential at the beginning of the first period A1; and electrical potentials of the first high electrical potential signal S1 is the first electrical potential V1, and electrical potentials of the first high electrical potential signal S1 and the first electrical potential V1 are the same.

Specifically, before the initial period A0, turning on the second transistor T2, turning off the first transistor T1 and the third transistor T3, charging the electrical potential of the first node Pn from the low electrical potential to the first electrical potential V1 which is the first high potential signal S1 through the second transistor T2 by the data signal Data, and also charging the first capacitor C1; at the beginning of the initial period A0, turning off the second transistor T2, and holding the electrical potential of the first node Pn at the first electrical potential V1 in the initial period A0 and the first period A1 by the first capacitor C1.

In the first boost phase B1, the previous row gate output signal G(n−1) is at the low electrical potential, turning off the second transistor T2, the next row gate output signal (G(n+1)) is at the low electrical potential, turning off the third transistor T3, the data signal Data is at the low electrical potential and no data is sent, and the current row gate output signal G(n) is at the high electrical potential V0. Because the two terminals of the capacitor cooperating work, the electrical potential of the first node Pn is raised from the first electrical potential V1 to the second electrical potential V2 through the first capacitor C1 by the current row gate output signal G(n), wherein a degree of increase of the second electrical potential V2 over the first electrical potential V1 is related to a difference between the high electrical potential V0 of the current row gate output signal G(n) and the constant voltage low electrical potential VGL.

In the second boost phase B2, the previous row gate output signal (G(n−1)) is at the low electrical potential, turning off the second transistor T2, the next row gate output signal (G(n+1)) is at the low electrical potential, turning off the third transistor T3, holding the current row gate output signal G(n) at the high electrical potential V0, and sending the second high electrical potential signal S2 by the data signal Data. It is the same as the principle that raising the electrical potential of the first node Pn from the first electrical potential V1 to the second electrical potential V2 through the first capacitor C1 by the current row gate output signal G(n) in the first boost phase B1, at this time, raising the electrical potential of the first node Pn from the second electrical potential V2 to the third electrical potential V3 through the second capacitor C2 by the data signal Data, wherein the third electrical potential V3 is higher than the high electrical potential V0 of the gate output signal. Therefore, raising the electrical potential of the node Pn from the second electrical potential V2 to the third electrical potential V3 through the second capacitor C2 by the data signal Data, and the second high electrical potential signal S2 is written to the storage capacitor Cst. As a result, one data writing is completed, wherein the third electrical potential V3 is higher than the second electrical potential V2, wherein a degree of increase of the third electrical potential V3 over the second electrical potential V2 is related to the difference between the second high electrical potential signal S2 and an electrical potential value $V_{COM}$ of the common signal Com.

It should be noted that the high electrical potential V0 of the third electrical potential V3 higher than the gate output signal G(n) is set according to the circuit components and each driving signal. Specifically, the third electrical potential V3 higher than the high potential of the gate output signal V0 is based on Formula 1 and Formula 2, according to the first high electrical potential signal S1, the second high electrical potential signal S2, the high potential of the gate output signal G(n), the constant voltage low electrical potential VGL and the common signal Com voltage $V_{COM}$, achieved by adjusting the capacitance values of the first capacitor C1 and the second capacitor C2. Among them, formula 1 and formula 2 are detailed below.

In the transition phase B3, the previous row gate output signal G(n−1) and the current row gate output signal G(n) are at the low electrical potential, so the first transistor T1, the second transistor T2, and the third transistor T3 are all turned off, and the data signal Data is kept at the second high electrical potential signal S2 before the second period A2 and is converted to the low electrical potential at a beginning of the second period A2. Therefore, when the current row gate output signal G(n) is converted to the low electrical potential, the electrical potential of the first node Pn will be reduced from the third electrical potential V3 to the fourth potential V4 through the first capacitor C1.

In the holding phase B4, the previous row gate output signal G(n−1) and the is current row gate output signal G(n) are at the low electrical potential, and the next row gate output signal G(n+1) is a pulse of high electrical potential V0. At this time, turning off the first transistor T1 and the second transistor T2, turning on the third transistor T3, and holding the electrical potential of the first node Pn at the constant voltage low electrical potential VGL by the next row gate output signal G(n+1).

In the embodiment of the present disclosure, after precharging the first node Pn to set its electrical potential to the first electrical potential, raising the electrical potential of the first node Pn from the first potential V1 to the second electrical potential V2 through the first capacitor C1 by the current row gate output signal G(n), and then raising the electrical potential of the first node Pn from the second electrical potential V2 to the third electrical potential V3 through the second capacitor C2 by the data signal Data, wherein the third electrical potential V3 is greater than the high electrical potential V0 of the current row gate output signal G(n), turning on the first transistor T1 and writing data to the liquid crystal capacitor Clc. Since the pixel driving circuit can raise the gate electrical potential of the first transistor T1 to an electrical potential greater than the high electrical potential V0 of the current row gate output signal G(n), therefore raising the original gate electrical potential so that the driving ability of the first transistor T1 is better, thereby making it suitable for the requirement of fast charging at high frequency, even if the first transistor T1 uses an IGZO transistor. Hence, the pixel driving circuit can be suitable for dynamic frame rate technology.

Based on the above embodiments, a relationship between the first electrical potential V1 and the second electrical potential V2 is a formula 1:

$$V_2 = (V_0 - VGL)g\frac{C_1}{C_1 + C_2 + 2C_{gs1} + C_{gs2} + C_{gs3}} + V_1 \quad \text{formula 1}$$

wherein $V_1$ is an electrical potential value of the first electrical potential V1, $V_2$ is an electrical potential value of the second electrical potential V2, $C_1$ is a capacitance value of the first capacitor, $V_0$ is an electrical potential value of the high electrical potential V0 of the gate output signal, $C_2$ is a capacitance value of the second capacitor, VGL is the constant voltage low electrical potential, $C_{gs1}$ is a single-sided parasitic capacitance value of the first transistor, $C_{gs2}$ is a single-sided parasitic capacitance value of the second transistor, and $C_{gs3}$ is a single-sided parasitic capacitance value of the third transistor In some embodiments, a relationship between the second electrical potential V2 and the third electrical potential V3 is a formula 2:

$$V_3 = (S_2 - V_{COM})g\frac{C_2}{C_1 + C_2 + 2C_{gs1} + C_{gs2} + C_{gs3}} + V_2 \quad \text{formula 2}$$

wherein the $V_2$ is the electrical potential value of the second electrical potential V2, $V_3$ is the electrical potential value of the third electrical potential V3, the $C_1$ is the capacitance value of the first capacitor, $S_2$ is the electrical potential value of the second high electrical potential S2, the $C_2$ is the capacitance value of the second capacitor, $V_{COM}$ is an electrical potential value of the common signal, the $C_{gs1}$ is the single-sided parasitic capacitance value of the first transistor, the $C_{gs2}$ is the single-sided parasitic capacitance value of the second transistor, and the $C_{gs3}$ is the single-sided parasitic capacitance value of the third transistor.

In addition, it should be noted that after writing data, in principle, introducing the constant voltage low electrical potential VGL because the next row gate output signal G(n+1) is high, then pulling down the electrical potential of the first node Pn to low. However, the jump of the data signal Data will reduce the voltage of the liquid crystal capacitor Clc due to the influence of parasitic capacitance and leakage current of the second capacitor C2. That is, the jump of the data signal Data may cause clock feedthrough or crosstalk phenomenon of the pixel driving circuit, which leads to poor picture holding ability, that is, the duration of the holding time becomes shorter.

Figure 4:
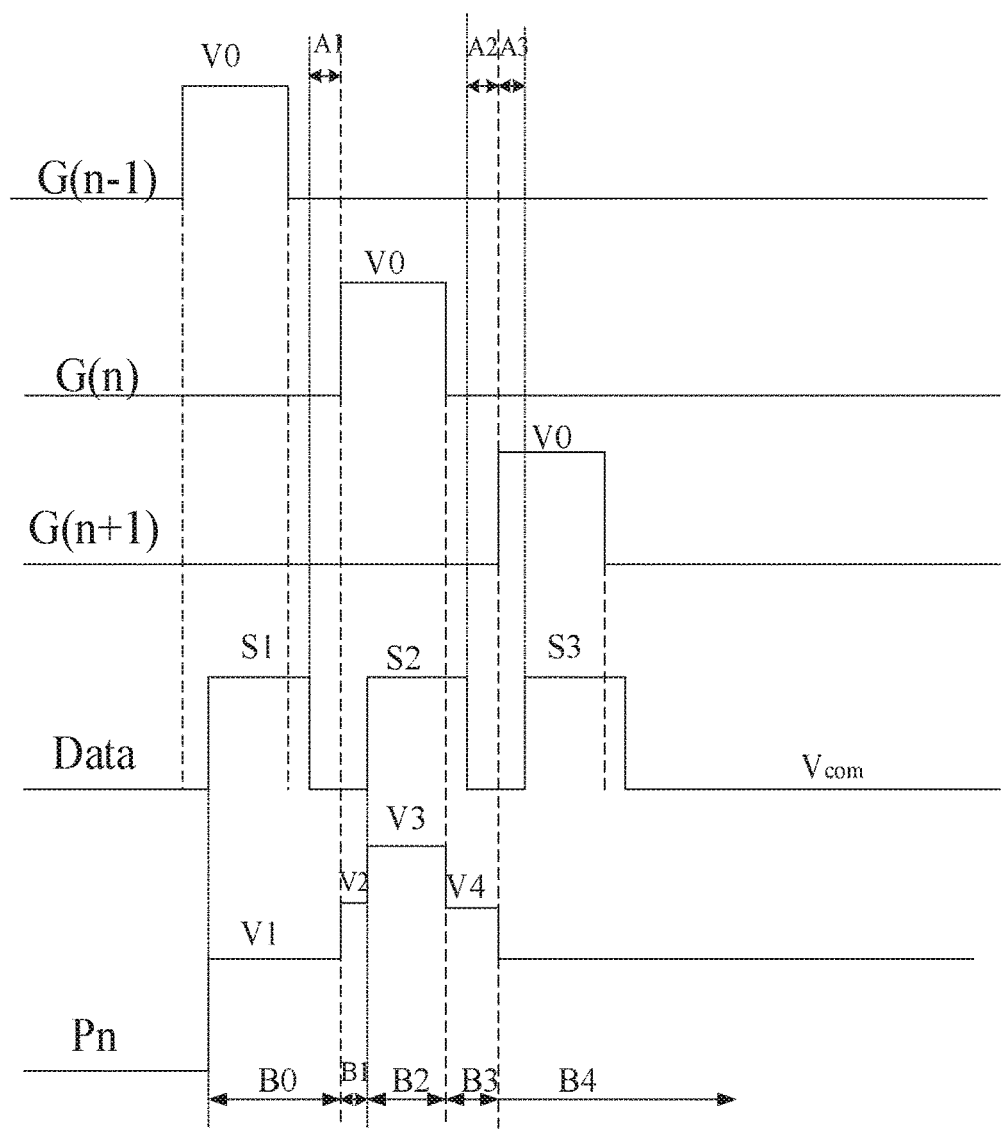
FIG. 4 is another timing diagram of the pixel driving circuit of one embodiment of the present disclosure.

For example, FIG. 4 is another timing diagram of the pixel driving circuit of one embodiment of the present disclosure. Referring to FIG. 4, in the holding phase B4, if the data signal Data sends the third high electrical potential signal S3 after the third period A3 which comprises introducing a constant voltage low electrical potential VGL by the next row of the gate output signal G(n+1), due to the one-side parasitic capacitances of the first transistor T1, the second transistor T2, and the third transistor T3, which causes leakage current in the first transistor T1 from the drain electrode of the first transistor T1, that is the pixel electrode, to the source of the first transistor T1, that is the data signal Data, this causes the voltage of the liquid crystal capacitor Clc to be reduced, resulting in inaccurate display of the screen corresponding to the second high electrical potential signal S2.

Even when the data signal Data jumps to the third high electrical potential signal, if the electrical potential of the Pn node is increased by the second capacitor to turn on the first transistor T1, current of the liquid crystal capacitor will leak through the first transistor T1, thereby causing the picture holding time corresponding to the second high electrical potential signal S2 to be shorter.

Figure 5:
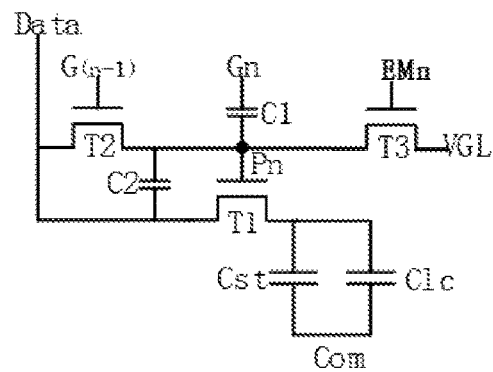
FIG. 5 is another pixel driving circuit according to one embodiment of the present disclosure.
Figure 6:
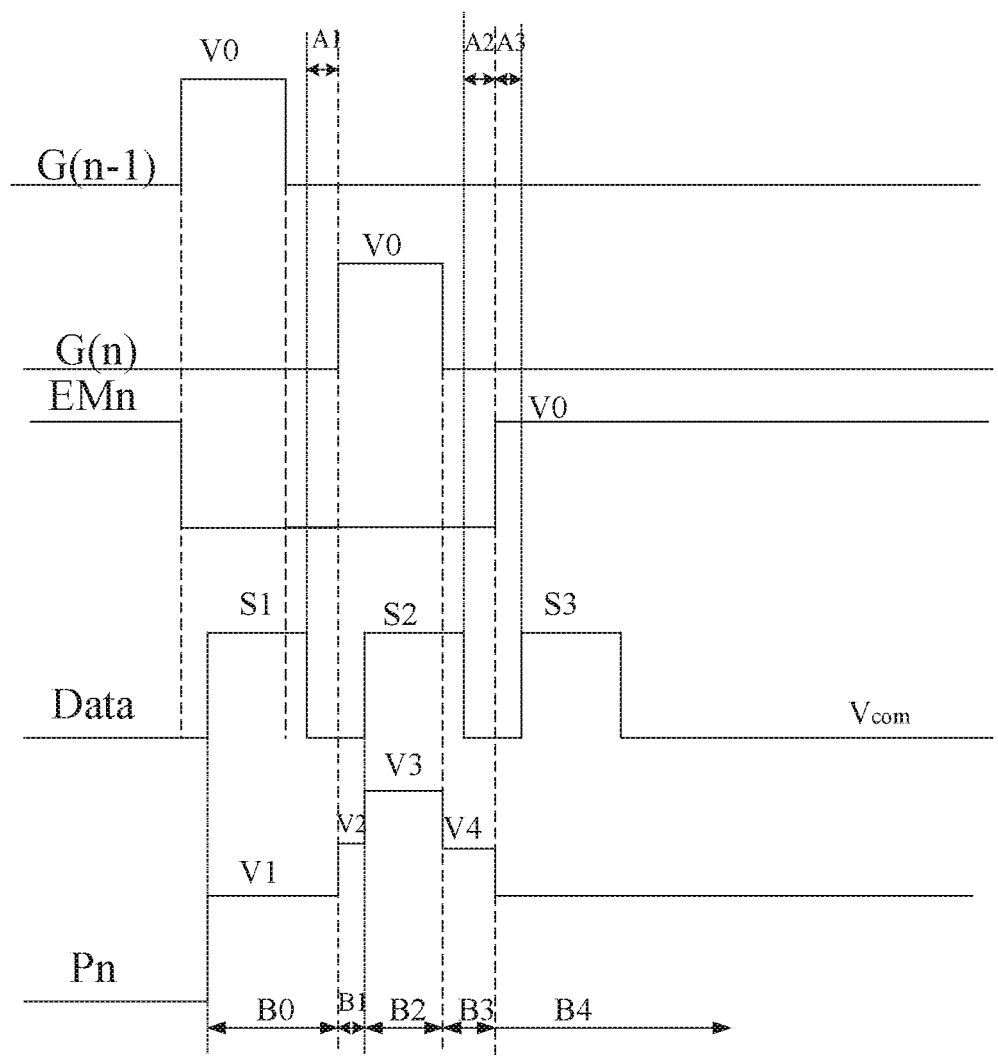
FIG. 6 is a timing diagram of another pixel driving circuit according to one embodiment of the present disclosure.

In view of the foregoing problems, the embodiments of the present disclosure have further made improvements. FIG. 5 is another pixel driving circuit according to one embodiment of the present disclosure, and FIG. 6 is a timing diagram of another pixel driving circuit according to one embodiment of the present disclosure. Referring to FIGS. 5 and 6, in the holding phase B4, the data signal Data of next row gate output signal G(n+1) converts from a low electrical potential to a third high electrical potential signal S3 after converting to the high electrical potential, replacing the next row of the gate output signal G(n+1) by the enable signal EMn, the enable signal EMn being the low electrical potential in the pre-charge phase B0, the first boost phase B1, the second boost phase B2, and the transition phase B3, and being the high electrical potential in the holding phase B4, so that the electrical potential of the first node Pn is kept at the low electrical potential stably in the holding phase B4, without being affected by the jump of the data signal Data, so that the picture corresponding to the second high electrical potential signal S2 remains stable in the holding phase B4, which effectively improves the picture holding ability.

Figure 1:
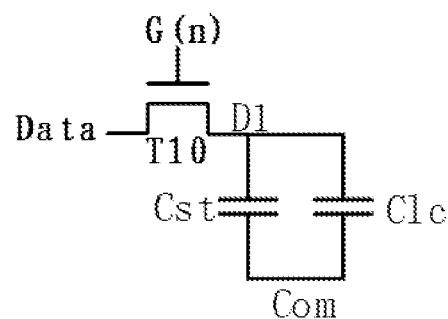
FIG. 1 is a diagram of structure of currently 1T2C pixel driving circuit.

Or as shown in FIG. 1 directly, in the holding phase B4, holding the data signal Data at the low electrical potential can also prevent the impact of its jump on the first node Pn, thereby improving the picture holding ability.

The present disclosure also provides a display panel including the above-mentioned pixel driving circuit. The display panel has the same structure and beneficial effects as the pixel driving circuit provided in the foregoing embodiments. Since the foregoing embodiment has described the structure and beneficial effects of the pixel driving circuit in detail, it will not be repeated here.

It can be understood that, for those of ordinary skill in the art, equivalent replacements or changes can be made according to the technical solution of the present disclosure and its inventive concept, and all these changes or replacements shall fall within the protection scope of the appended claims of the present disclosure.

What is claimed is:

1. A pixel driving circuit, comprising:
a first transistor, a second transistor, a third transistor, a first capacitor, a second capacitor, a storage capacitor, and a liquid crystal capacitor, wherein each of the first transistor, the second transistor, and the third transistor comprises a source, a gate, and a drain, and each of the first capacitor, the second capacitor, the storage capacitor, and the liquid crystal capacitor comprises a first terminal and a second terminal;
the gate of the first transistor is electrically connected to a first node, the source of the first transistor is electrically connected to the first terminal of the second capacitor, and the drain of the first transistor is electrically connected to the first terminal of the storage capacitor and the first terminal of the liquid crystal capacitor;
the gate of the second transistor is electrically connected to a previous row gate output signal (G(n−1)), the source of the second transistor is electrically connected to a data signal, and the drain of the second transistor is electrically connected to the first node;
the gate of the third transistor is electrically connected to a next row gate output signal (G(n+1)), the source of the third transistor is electrically connected to the first node, and the drain of the third transistor is electrically connected to a constant voltage low electrical potential (VGL);
the first terminal of the first capacitor is electrically connected to the first node, and the second terminal of the first capacitor is electrically connected to a current row gate output signal (G(n));
the first terminal of the second capacitor is electrically connected to the data signal, and the second terminal of the second capacitor is electrically connected to the first node; and
the first terminal of the storage capacitor and the first terminal of the liquid crystal capacitor are respectively electrically connected to the drain of the first transistor, and the second terminal of the storage capacitor and the second terminal of the liquid crystal capacitor are respectively electrically connected to a common signal,
wherein the pixel driving circuit operates in a pre-charge phase (B0), a first boost phase (B1), a second boost phase (B2), a transition phase (B3), and a holding phase (B4), and the first transistor, the second transistor, and the third transistor are N-type thin film transistors;
wherein the pre-charge phase (B0) comprises steps of: turning on the second transistor and turning off the third transistor, and charging an electrical potential of the first node to a first electrical potential (V1) through the second transistor by the current row gate output signal (G(n));
wherein the first boost phase (B1) comprises steps of: turning off the second transistor and the third transistor, providing a first high electrical potential signal (S1) by the data signal, and raising the electrical potential of the first node from the first electrical potential (V1) to a second electrical potential (V2) through the first capacitor by the data signal;
wherein the second boost phase (B2) comprises steps of: turning off the second transistor and the third transistor, providing a second high electrical potential signal (S2) by the data signal, raising the electrical potential of the first node from the second electrical potential (V2) to a third electrical potential (V3) by the second capacitor, and writing the second high electrical potential signal (S2) into the liquid crystal capacitor, wherein the third electrical potential (V3) is greater than a high electrical potential (V0) of a gate output signal;
wherein the transition phase (B3) comprises steps of: turning off the first transistor, the second transistor, and the third transistor, pulling down the electrical potential of the first node from the third electrical potential (V3) to a fourth electrical potential (V4) through the first capacitor by the current row gate output signal (G(n)), and pulling down the electrical potential of the first node from the fourth potential (V4) to the constant voltage low electrical potential (VGL) by the next row gate output signal (G(n+1)); and wherein the holding phase (B4) comprises steps of: turning off the first transistor and the second transistor, turning on the third transistor, and holding the electrical potential of the first node at the constant voltage low electrical potential (VGL) by the next row gate output signal (G(n+1)).

2. The pixel driving circuit as claimed in claim 1, wherein the first transistor, the second transistor, and the third transistor are oxide semiconductor thin film transistors.

3. The pixel driving circuit as claimed in claim 1, wherein the first transistor is an oxide semiconductor thin film transistor, and the second transistor and the third transistor are both low temperature polysilicon thin film transistors.

4. The pixel driving circuit as claimed in claim 1, wherein
in the pre-charge phase (B0), the previous row gate output signal (G(n−1)) is at the high electrical potential (V0) before an initial period (A0) and is converted to a low electrical potential at a beginning of the initial period (A0), the current row gate output signal (G(n)) is at the low electrical potential, the next row gate output signal (G(n+1)) is at the low electrical potential, the data signal before a first period (A1) is the first high electrical potential signal (S1) and is at the low electrical potential in the first period (A1), and electrical potentials of the first high electrical potential signal (S1) and the first electrical potential (V1) are identical;
in the first boost phase (B1), the previous row gate output signal (G(n−1)) is at the low electrical potential, the current row gate output signal (G(n)) is at the high electrical potential (V0), the next row gate output signal (G(n+1)) is at the low electrical potential, and the data signal is at the low electrical potential;
in the second boost phase (B2), the previous row gate output signal (G(n−1)) is at the low electrical potential, the current row gate output signal (G(n)) is at the high electrical potential (V0), the next row gate output signal (G(n+1)) is at the low electrical potential, and the data signal is at the second high electrical potential signal (S2);
in the transition phase (B3), the previous row gate output signal (G(n−1)) and the current row gate output signal (G(n)) are at the low electrical potential, and the data signal is kept at the second high electrical potential signal (S2) before a second period (A2) and is converted to the low electrical potential at a beginning of the second period (A2); and
in the holding phase (B4), the previous row gate output signal (G(n−1)) and the current row gate output signal (G(n)) are at the low electrical potential, and the next row gate output signal (G(n+1)) is a pulse of the high electrical potential V0.

5. The pixel driving circuit as claimed in claim 4, wherein a relationship between the first electrical potential (V1) and the second electrical potential (V2) is a formula 1:

$$V_2 = (V_0 - VGL)g\frac{C_1}{C_1 + C_2 + 2C_{gs1} + C_{gs2} + C_{gs3}} + V_1 \quad \text{formula 1}$$

wherein $V_1$ is an electrical potential value of the first electrical potential V1, $V_2$ is an electrical potential value of the second electrical potential V2, $C_1$ is a capacitance value of the first capacitor, $V_0$ is an electrical potential value of the high electrical potential V0 of the gate output signal, $C_2$ is a capacitance value of the second capacitor, VGL is the constant voltage low electrical potential, $C_{gs1}$ is a single-sided parasitic capacitance value of the first transistor, $C_{gs2}$ is a single-sided parasitic capacitance value of the second transistor, and $C_{gs3}$ is a single-sided parasitic capacitance value of the third transistor.

6. The pixel driving circuit as claimed in claim 5, wherein a relationship between the second electrical potential (V2) and the third electrical potential (V3) is a formula 2:

$$V_3 = (S_2 - V_{COM})g\frac{C_2}{C_1 + C_2 + 2C_{gs1} + C_{gs2} + C_{gs3}} + V_2 \quad \text{formula 2}$$

wherein the $V_2$ is the electrical potential value of the second electrical potential V2, $V_3$ is the electrical potential value of the third electrical potential V3, the $C_1$ is the capacitance value of the first capacitor, $S_2$ is the electrical potential value of the second high electrical potential S2, the $C_2$ is the capacitance value of the second capacitor, $V_{COM}$ is an electrical potential value of the common signal, the $C_{gs1}$ is the single-sided parasitic capacitance value of the first transistor, the $C_{gs2}$ is the single-sided parasitic capacitance value of the second transistor, and the $C_{gs3}$ is the single-sided parasitic capacitance value of the third transistor.

7. The pixel driving circuit as claimed in claim 6, wherein the third electrical potential (V3) being higher than the high electrical potential (V0) of the gate output signal is realized by adjusting the capacitance values of the first capacitor and the second capacitor based on the formula 1 and the formula 2 with the electrical potential values of the first high potential signal, the second high potential signal, the high electrical potential (V0) of the gate output signal, the constant voltage low electrical potential (VGL), and the common signal (VCOM).

8. The pixel driving circuit as claimed in claim 4, wherein the holding phase (B4) comprises steps of: holding the data signal at the low electrical potential in a third period (A3), and converting the data signal from the low electrical potential to a third high level signal (S3) after the third period (A3); and
replacing the next row gate output signal (G(n+1)) by an enable signal (EMn), wherein the enable signal (EMn) is at the low electrical potential in the pre-charge phase (B0), the first boost phase (B1), the second boost phase (B2), and the transition phase (B3), and is converted to the high electrical potential in the holding phase (B4).

9. The pixel driving circuit as claimed in claim 4, wherein the holding phase (B4) comprises steps of: holding the data signal at the low electrical potential.

10. A display panel, comprising a pixel driving circuit, wherein the pixel driving circuit comprises:
a first transistor, a second transistor, a third transistor, a first capacitor, a second capacitor, a storage capacitor, and a liquid crystal capacitor, wherein each of the first transistor, the second transistor, and the third transistor comprises a source, a gate, and a drain, and each of the first capacitor, the second capacitor, the storage capacitor, and the liquid crystal capacitor comprises a first terminal and a second terminal;
the gate of the first transistor is electrically connected to a first node, the source of the first transistor is electrically connected to the first terminal of the second capacitor, and the drain of the first transistor is electrically connected to the first terminal of the storage capacitor and the first terminal of the liquid crystal capacitor;

the gate of the second transistor is electrically connected to a previous row gate output signal (G(n−1)), the source of the second transistor is electrically connected to a data signal, and the drain of the second transistor is electrically connected to the first node;

the gate of the third transistor is electrically connected to a next row gate output signal (G(n+1)), the source of the third transistor is electrically connected to the first node, and the drain of the third transistor is electrically connected to a constant voltage low electrical potential (VGL);

the first terminal of the first capacitor is electrically connected to the first node, and the second terminal of the first capacitor is electrically connected to a current row gate output signal (G(n));

the first terminal of the second capacitor is electrically connected to the data signal, and the second terminal of the second capacitor is electrically connected to the first node; and the first terminal of the storage capacitor and the first terminal of the liquid crystal capacitor are respectively electrically connected to the drain of the first transistor, and the second terminal of the storage capacitor and the second terminal of the liquid crystal capacitor are respectively electrically connected to a common signal, wherein the pixel driving circuit operates in a pre-charge phase (B0), a first boost phase (B1), a second boost phase (B2), a transition phase (B3) and a holding phase (B4), and the first transistor, the second transistor and the third transistor are N-type thin film transistors;

wherein the pre-charge phase (B0) comprises steps of: turning on the second transistor and turning off the third transistor, and charging an electrical potential of the first node to a first electrical potential (V1) through the second transistor by the current row gate output signal (G(n));

wherein the first boost phase (B1) comprises steps of: turning off the second transistor and the third transistor providing a first high electrical potential signal (S1) by the data signal, and raising the electrical potential of the first node from the first electrical potential (V1) to a second electrical potential (V2) through the first capacitor by the data signal;

wherein the second boost phase (B2) comprises steps of: turning off the second transistor and the third transistor, providing a second high electrical potential signal (S2) by the data signal, raising the electrical potential of the first node from the second electrical potential (V2) to a third electrical potential (V3) by the second capacitor, and writing the second high electrical potential signal (S2) into the liquid crystal capacitor, wherein the third electrical potential (V3) is greater than a high electrical potential (V0) of a gate output signal;

wherein the transition phase (B3) comprises steps of: turning off the first transistor, the second transistor, and the third transistor, pulling down the electrical potential of the first node from the third electrical potential (V3) to a fourth electrical potential (V4) through the first capacitor by the current row gate output signal (G(n)), and pulling down the electrical potential of the first node from the fourth potential (V4) to the constant voltage low electrical potential (VGL) by the next row gate output signal (G(n+1)); and wherein the holding phase (B4) comprises steps of: turning off the first transistor and the second transistor, turning on the third transistor, and holding the electrical potential of the first node at the constant voltage low electrical potential (VGL) by the next row gate output signal (G(n+1)).

11. The display panel as claimed in claim 10, wherein the first transistor, the second transistor, and the third transistor are oxide semiconductor thin film transistors.

12. The display panel as claimed in claim 10, wherein the first transistor is an oxide semiconductor thin film transistor, and the second transistor and the third transistor are both low temperature polysilicon thin film transistors.

13. The display panel as claimed in claim 10, wherein
in the pre-charge phase (B0), the previous row gate output signal (G(n−1)) is at the high electrical potential (V0) before an initial period (A0) and is converted to a low electrical potential at a beginning of the initial period (A0), the current row gate output signal (G(n)) is at the low electrical potential, the next row gate output signal (G(n+1)) is at the low electrical potential, the data signal before a first period (A1) is the first high electrical potential signal (S1) and is at the low electrical potential in the first period (A1), and electrical potentials of the first high electrical potential signal (S1) and the first electrical potential (V1) are identical;

in the first boost phase (B1), the previous row gate output signal (G(n−1)) is at the low electrical potential, the current row gate output signal (G(n)) is at the high electrical potential (V0), the next row gate output signal (G(n+1)) is at the low electrical potential, and the data signal is at the low electrical potential;

in the second boost phase (B2), the previous row gate output signal (G(n−1)) is at the low electrical potential, the current row gate output signal (G(n)) is at the high electrical potential (V0), the next row gate output signal (G(n+1)) is at the low electrical potential, and the data signal is at the second high electrical potential signal (S2);

in the transition phase (B3), the previous row gate output signal (G(n−1)) and the current row gate output signal (G(n)) are at the low electrical potential, and the data signal is kept at the second high electrical potential signal (S2) before a second period (A2) and is converted to the low electrical potential at a beginning of the second period (A2); and in the holding phase (B4), the previous row gate output signal (G(n−1)) and the current row gate output signal (G(n)) are at the low electrical potential, and the next row gate output signal (G(n+1)) is a pulse of the high electrical potential V0.

14. The display panel as claimed in claim 13, wherein a relationship between the first electrical potential (V1) and the second electrical potential (V2) is a formula 1:

$$V_2 = (V_0 - VGL)g\frac{C_1}{C_1 + C_2 + 2C_{gs1} + C_{gs2} + C_{gs3}} + V_1 \quad \text{formula 1}$$

wherein $V_1$ is an electrical potential value of the first electrical potential V1, $V_2$ is an electrical potential value of the second electrical potential V2, $C_1$ is a capacitance value of the first capacitor, $V_0$ is an electrical potential value of the high electrical potential V0 of the gate output signal, $C_2$ is a capacitance value of the second capacitor, VGL is the constant voltage low electrical potential, $C_{gs1}$ is a single-sided parasitic capacitance value of the first transistor, $C_{gs2}$ is a single-sided parasitic capacitance value of the second transistor, and $C_{gs3}$ is a single-sided parasitic capacitance value of the third transistor.

15. The display panel as claimed in claim 14, wherein a relationship between the second electrical potential (V2) and the third electrical potential (V3) is a formula 2:

$$V_3 = (S_2 - V_{COM}) g \frac{C_2}{C_1 + C_2 + 2C_{gs1} + C_{gs2} + C_{gs3}} + V_2 \quad \text{formula 2}$$

wherein the $V_2$ is the electrical potential value of the second electrical potential V2, $V_3$ is the electrical potential value of the third electrical potential V3, the $C_1$ is the capacitance value of the first capacitor, $S_2$ is the electrical potential value of the second high electrical potential S2, the $C_2$ is the capacitance value of the second capacitor, $V_{COM}$ is an electrical potential value of the common signal, the $C_{gs1}$ is the single-sided parasitic capacitance value of the first transistor, the $C_{gs2}$ is the single-sided parasitic capacitance value of the second transistor, and the $C_{gs3}$ is the single-sided parasitic capacitance value of the third transistor.

16. The display panel as claimed in claim 15, wherein the third electrical potential (V3) being higher than the high electrical potential (V0) of the gate output signal is realized by adjusting the capacitance values of the first capacitor and the second capacitor based on the formula 1 and the formula 2, with the electrical potential values of the first high potential signal, the second high potential signal, the high electrical potential (V0) of the gate output signal, the constant voltage low electrical potential (VGL), and the common signal ($V_{COM}$).

17. The display panel as claimed in claim 13, wherein the holding phase (B4) comprises steps of: holding the data signal at the low electrical potential in a third period (A3), and converting the data signal from the low electrical potential to a third high level signal (S3) after the third period (A3); and replacing the next row gate output signal (G(n+1)) by an enable signal (EMn), wherein the enable signal (EMn) is at the low electrical potential in the pre-charge phase (B0), the first boost phase (B1), the second boost phase (B2) and the transition phase (B3), and is converted to the high electrical potential in the holding phase (B4).

18. The display panel as claimed in claim 13, wherein the holding phase (B4) comprises steps of: holding the data signal at the low electrical potential.

* * * * *